(12) United States Patent
Iwakura et al.

(10) Patent No.: US 10,831,200 B2
(45) Date of Patent: Nov. 10, 2020

(54) FLIGHT CONTROL DEVICE AND PROFILE MEASUREMENT DEVICE

(71) Applicant: Mitsubishi Electric Corporation, Chiyoda-ku (JP)

(72) Inventors: Takashi Iwakura, Chiyoda-ku (JP); Takayuki Ishida, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 69 days.

(21) Appl. No.: 15/945,152

(22) Filed: Apr. 4, 2018

(65) Prior Publication Data

US 2018/0307230 A1    Oct. 25, 2018

(30) Foreign Application Priority Data

Apr. 24, 2017    (JP) .................................. 2017-085485

(51) Int. Cl.
*G05D 1/02* (2020.01)
*B64C 39/02* (2006.01)
(Continued)

(52) U.S. Cl.
CPC ......... *G05D 1/0202* (2013.01); *B64C 39/024* (2013.01); *G05D 1/0094* (2013.01); *G06K 9/00637* (2013.01); *B64C 2201/14* (2013.01)

(58) Field of Classification Search
CPC ........................ B64C 2201/14; B64C 39/024; G05D 1/0094; G05D 1/0202; G06K 9/00637

See application file for complete search history.

(56) References Cited

U.S. PATENT DOCUMENTS 8,630,755 B2 *  1/2014  Ohtomo ................ B64C 39/024
                                                348/144
9,738,381 B1 *  8/2017  Loud ..................... B64C 39/024
(Continued)

FOREIGN PATENT DOCUMENTS

JP    2009-52924 A    3/2009
JP    2012-140101    7/2012
(Continued)

OTHER PUBLICATIONS

Japanese Office Action dated May 21, 2019, in Patent Application No. 2017-085485, 5 pages (with unedited computer generated English translation).
(Continued)

*Primary Examiner* — Babar Sarwar
(74) *Attorney, Agent, or Firm* — Oblon, McClelland, Maier & Neustadt, L.L.P.

(57) ABSTRACT

A flight control device which controls an air vehicle flying around a structure, the flight control device including: a detection-position movement controller which causes the air vehicle to move to a detection position for detecting the designated sign, the detection position being given for the designated sign; a sign detector which, when the air vehicle arrives at the detection position, detects the identification code of the sign and measures a flight relative position which is a position of the air vehicle relative to the sign; and a designated-position adjustment unit which, when the sign detector detects the identification code of the designated sign, controls a flying position of the air vehicle, based on the flight relative position and a position of the via point relative to the designated sign, so that the flying position matches the via point.

4 Claims, 6 Drawing Sheets

(51) Int. Cl.
*G06K 9/00* (2006.01)
*G05D 1/00* (2006.01)

(56) References Cited

U.S. PATENT DOCUMENTS

| | | | | |
|---|---|---|---|---|
| 9,823,658 | B1* | 11/2017 | Loveland | G05D 1/0094 |
| 10,035,592 | B1* | 7/2018 | Hanlon | G01M 1/125 |
| 10,218,893 | B2* | 2/2019 | Iwakura | B64D 17/00 |
| 10,410,105 | B1* | 9/2019 | Stoman | B65D 25/20 |
| 2010/0215212 | A1* | 8/2010 | Flakes, Jr. | G01M 5/0025 |
| | | | | 382/100 |
| 2012/0173053 | A1* | 7/2012 | Ohtomo | G01C 11/04 |
| | | | | 701/4 |
| 2014/0168420 | A1* | 6/2014 | Naderhirn | F03D 17/00 |
| | | | | 348/128 |
| 2016/0377424 | A1* | 12/2016 | Clark | G01B 11/303 |
| | | | | 356/600 |
| 2017/0073065 | A1* | 3/2017 | Von Novak | B64C 39/024 |
| 2017/0127652 | A1* | 5/2017 | Shen | A01K 15/021 |
| 2017/0320569 | A1* | 11/2017 | Gordon | G05D 1/101 |
| 2017/0329037 | A1* | 11/2017 | Zhou | G01V 5/0083 |
| 2018/0039286 | A1* | 2/2018 | Tirpak | G05D 1/0676 |
| 2018/0053139 | A1* | 2/2018 | Stoman | G06Q 10/083 |
| 2018/0089622 | A1* | 3/2018 | Burch, V | G06Q 10/083 |
| 2018/0251219 | A1* | 9/2018 | Taylor | G06K 9/0063 |
| 2018/0262674 | A1* | 9/2018 | Iwakura | B64D 17/00 |

FOREIGN PATENT DOCUMENTS

| | | | |
|---|---|---|---|
| JP | 2015-121928 | | 7/2015 |
| JP | 2015121928 | A * | 7/2015 |
| JP | 2017-31740 | A | 2/2017 |
| JP | 2017031740 | A * | 2/2017 |

OTHER PUBLICATIONS

Office Action dated Dec. 25. 2019 in Japan Patent Application No. 2017-065485 (with English translation). 6 pages.

Office Action dated Sep. 8, 2020 in Japan Patent Application No. 2017-085485 (with English translation); 7 pgs.

* cited by examiner

MEMBER A   MEMBER B

FLIGHT CONTROL DEVICE AND PROFILE MEASUREMENT DEVICE

BACKGROUND OF THE INVENTION

Field of the Invention

The present disclosure relates to a flight control device which controls an air vehicle flying around a structure, and a profile measurement device which includes the flight control device.

Description of the Background Art

For performance demands of structures such as large aerials and large telescopes, profiles of the structures need to be managed and kept in given reference profiles. On the other hand, in use, these structures are distorted due to expansion with temperature or due to deflection under its own weight. For this reason, it is necessary to measure the profiles of the structures frequently to know what distortion is caused in these structures. There is a technology for measuring distortion in a large structure, in which a measurement device, such as photogrametry equipment, is mounted in a remotely controllable air vehicle such as a drone, and caused to move around a structure to measure the structure from given multiple points, and determines a profile of the structure based on the measurements (e.g., see Japanese Patent Laying-Open No. 2012-140101).

According to the technology disclosed in Japanese Patent Laying-Open No. 2012-140101, the measurement device uses technology known as photogrametry to measure a profile of a structure. In the photogrametry, the measurement device mounted in an air vehicle captures images of a structure, while moving to multiple capturing points around the structure to measure the profile of the structure. In order for the air vehicle to move to a given capturing point, the position of the air vehicle in-flight needs to be known by means of a navigation aid, for example. Generally, in order to accurately measure the profile of the structure by the photogrametry, the position of the air vehicle needs to be controlled so that the distance between the structure and the measurement device is a given distance.

The technology disclosed in Japanese Patent Laying-Open No. 2012-140101 utilizes a satellite positioning system, such as GPS, to know the position of the air vehicle. However, even if the position of the air vehicle is obtainable by the satellite positioning system, it is difficult to accurately adjust the distance between the structure and the air vehicle when the position of the structure is not obtained by the satellite positioning system or when the measurement is conducted on a structure whose orientation changes. Moreover, the accuracy of positions obtained while the air vehicle is moving around a large structure may be decreased due to blockage of radio waves from the satellite by the structure itself or a dome or the like which protects the structure.

SUMMARY OF THE INVENTION

The present disclosure is made to solve the above problems, and to provide a flight control device and a profile measurement device using the flight control device, which provide accurate adjustment of the position, relative to a structure, of an air vehicle flying around the structure.

A flight control device according to the present disclosure controls an air vehicle flying around a structure on which a plurality of signs are disposed at a plurality of locations, while passing through via points, the plurality of signs having different identification codes, the via points each being determined by a position of a via point relative to a predetermined designated sign among the plurality of signs, the flight control device including: a detection-position movement controller which causes the air vehicle to move to a detection position for detecting the designated sign, the detection position being given for the designated sign; a sign detector which, when the air vehicle arrives at the detection position, detects the identification code of the sign and measures a flight relative position which is a position of the air vehicle relative to the sign; and a designated-position adjustment unit which, when the sign detector detects the identification code of the designated sign, controls a flying position of the air vehicle, based on the flight relative position and a position of the via point relative to the designated sign, so that the flying position matches the via point.

A profile measurement device according to the present disclosure includes: the flight control device; and a measurement device which is mounted in the air vehicle and measures a profile of the structure.

According to the present disclosure, the flight control device and the profile measurement device using the flight control device can be provided, which provide accurate adjustment of the position, relative to a structure, of the air vehicle flying around the structure.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiment 1

Figure 1:
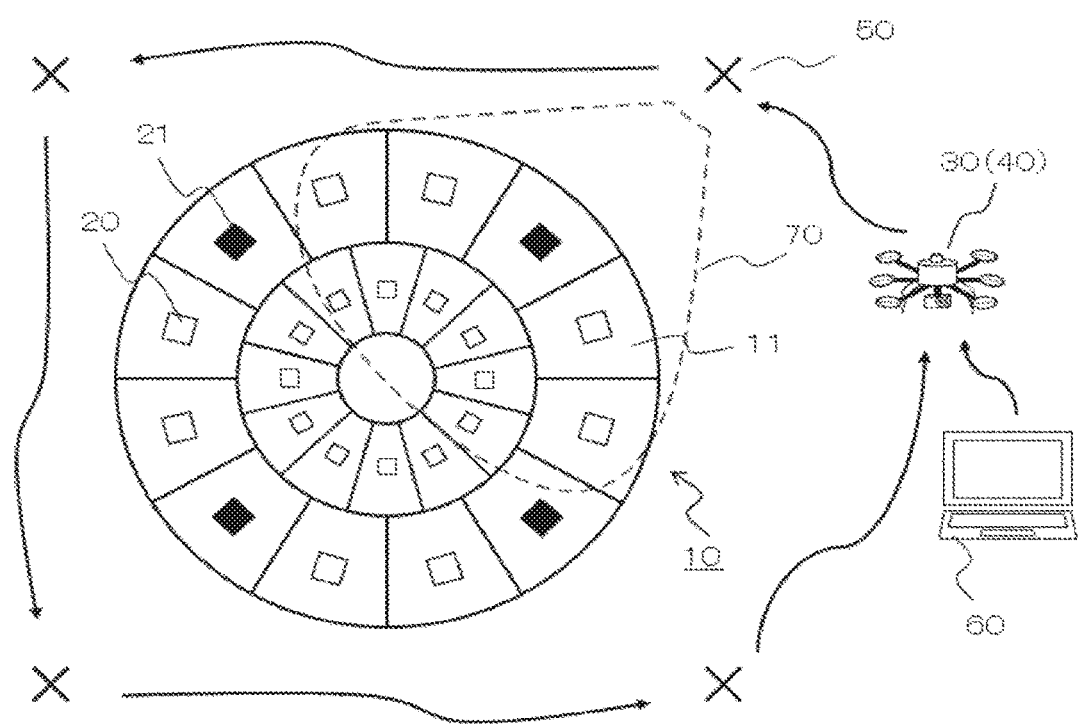
FIG. 1 is a schematic diagram illustrating an application of a profile measurement device according to Embodiment 1 of the present disclosure.

In the following, Embodiment 1 of the present disclosure is described, with reference to FIGS. 1 to 7. FIG. 1 is a schematic diagram illustrating an application of a profile measurement device according to Embodiment 1 of the present disclosure. In FIG. 1, a profile of a structure 10 is to be measured. Structure 10 includes multiple members 11 each provided with one or more signs 20. Signs 20 are each used as a positional reference of structure 10 when measuring a profile of structure 10. Signs 20 have different identification codes. Signs 20 are distinguished by the identification codes. In other words, multiple signs 20 having different identification codes are provided at multiple locations of structure 10.

In FIG. 1, a profile measurement device 30 mounted in an air vehicle 40 moves through the air around structure 10. Air vehicle 40 is an unmanned air vehicle capable of moving through and hovering in the air, examples of which include a drone, a multicopter, UAV, etc. Profile measurement device 30 moves around structure 10 according to a predetermined flight scenario, while passing through one or more via points 50 shown in the flight scenario. Profile measurement device 30 measures profiles of structure 10 from respective via points 50, based on which it measures an entire profile of structure 10. Profile measurement device 30 operates unattended, under control by a remote control device 60. Remote control device 60 sends, to profile measurement device 30 over wireless communications for example, commands and data, etc. which are necessary to control flight of air vehicle 40 and control measurement by profile measurement device 30.

Some signs 20 are in one-to-one correspondence with via points 50. Such a sign 20 in correspondence with via point 50 is referred to as designated sign 21. The position of each via point 50 is relative to a position of designated sign 21 that is made beforehand in correspondence with via point 50. Moreover, a detection position 51 is provided for each designated sign 21. Detection position 51 is a position for detecting designated sign 21 and measuring the distance between air vehicle 40 and designated sign 21. Signs 20 and designated signs 21 are represented in different colors to distinguish therebetween in FIG. 1. However, noted that they are identical in functionality and structure.

As shown in FIG. 1, profile measurement device 30 flies around structure 10, passing through four via points 50, for example. The number of via points 50 and their positions are determined so that profile measurement device 30 can measure an entire profile of structure 10 with necessary accuracy. For example, a larger number of via points 50 may be set to measure a large structure or a structure having a complex profile. A smaller number of via points 50 may be set to measure a small structure or a structure having a simple profile. FIG. 1 shows a measurement range 70 in which profile measurement device 30 measures structure 10 from one via point 50. While measurement range 70 from only one via point 50 is shown in FIG. 1, measurement ranges 70 in which structure 10 is measured from respective via points 50 are overlapping. For this reason, measurement device 30 stitches together the measurements taken from multiple via points 50 in a manner that the measurements in the overlapping portions result in a match, thereby measuring an entire profile of structure 10.

Figure 2:
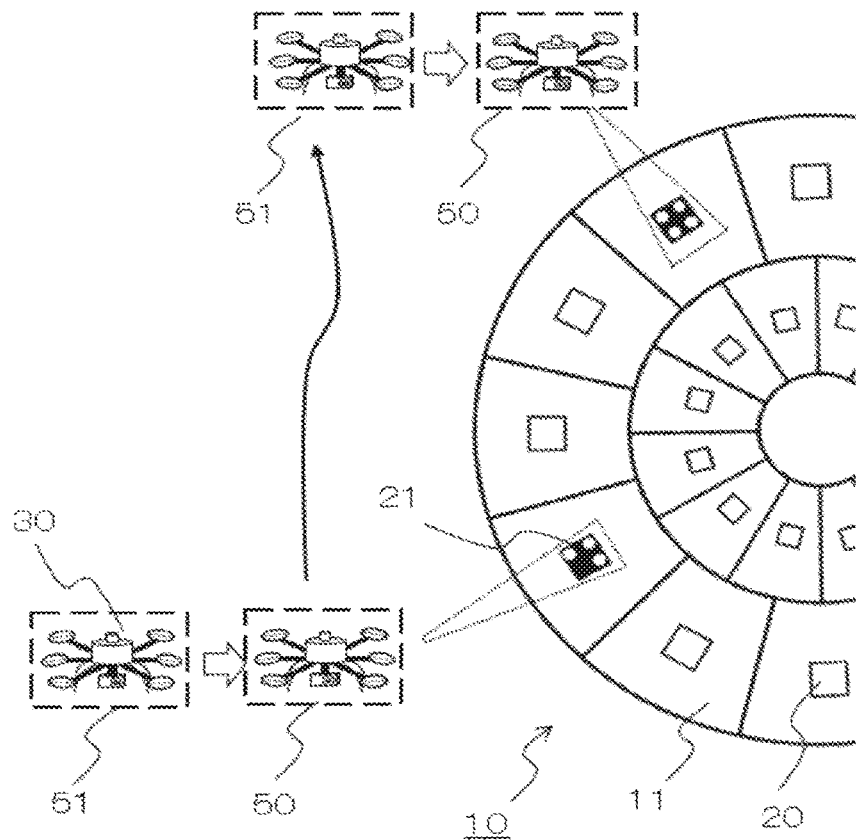
FIG. 2 is a schematic diagram illustrating operation of the profile measurement device according to Embodiment 1 of the present disclosure, moving according to a flight scenario.

FIG. 2 is a schematic diagram showing operation of profile measurement device 30 moving according to the flight scenario. As mentioned above, designated sign 21 is pre-set in one-to-one correspondence with via point 50 included in the flight scenario. Detection position 51 is also determined for each designated sign 21. Detection position 51 is a position for detecting designated sign 21. Note that via points 50 and detection positions 51 are indicated by dotted boxes enclosing profile measurement device 30 in FIG. 2. In order for profile measurement device 30 to move to via point 50, profile measurement device 30 first moves to detection position 51. As profile measurement device 30 moves to detection position 51, profile measurement device 30 detects designated sign 21.

The position of each via point 50 relative to corresponding designated sign 21 is determined. For this reason, profile measurement device 30 utilizes designated sign 21 to move to via point 50. After moving to via point 50, profile measurement device 30 moves to detection position 51 corresponding to next via point 50 described in the flight scenario. As such, profile measurement device 30 controls its own position relative to the positions of designated signs 21 on structure 10, thereby allowing the position of profile measurement device 30 relative to structure 10 to be kept accurately.

Note that via point 50 is determined based on the fact that via point 50 allows profile measurement device 30 to measure structure 10 with sufficient measurement accuracy and that via point 50 allows for measurement in a given range of structure 10 at once. On the other hand, detection position 51 is determined based on the fact that designated sign 21 can be readily detected from detection position 51. For this reason, via point 50 and detection position 51 may be the same position. For example, if structure 10 has a complex profile and there is often a risk of collision against structure 10 while profile measurement device 30 is traveling the flight route, easiness of flight and accuracy of measurement can be achieved equally by, for example, setting detection position 51 to a position which allows for easiness of flight and is farther away from designated sign 21 than via point 50 is.

Figure 3:
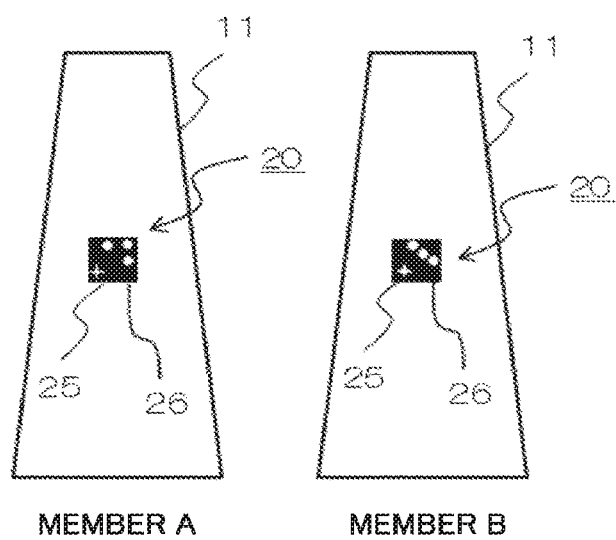
FIG. 3 shows external views of signs for use in flight control by a flight control device according to Embodiment 1 of the present disclosure.

FIG. 3 shows external views of signs 20. In FIG. 3, the signs on different members, member A and member B, are shown by way of example. One or more signs 20 are provided for each member. A positional reference mark 25 and an identification mark 26 are printed on sign 20. Positional reference mark 25 represents a reference of the position of sign 20. Identification mark 26 includes an identification code identifiable by image processing. Sign 20 may be a small piece, such as a seal having positional reference mark 25 and identification mark 26 printed thereon, and put on each member 11, or sign 20 may be positional reference mark 25 and identification mark 26 directly printed on each member 11.

Positional reference mark 25 and identification mark 26 are not limited to graphics and symbols, insofar as the position and the identification code are detectable from a distant position. Positional reference mark 25 and identification mark 26 may be, for example, transmitters which transmit a given coded signal from a given position and are detectable from a distant position by a receiver. Note that positional reference mark 25 may be anything that can be used as a reference of position. For this reason, identification mark 26 may be used as positional reference mark 25, without a particular independent mark as positional reference mark 25. Moreover, positional reference mark 25 may be sign 20 itself.

Figure 4:
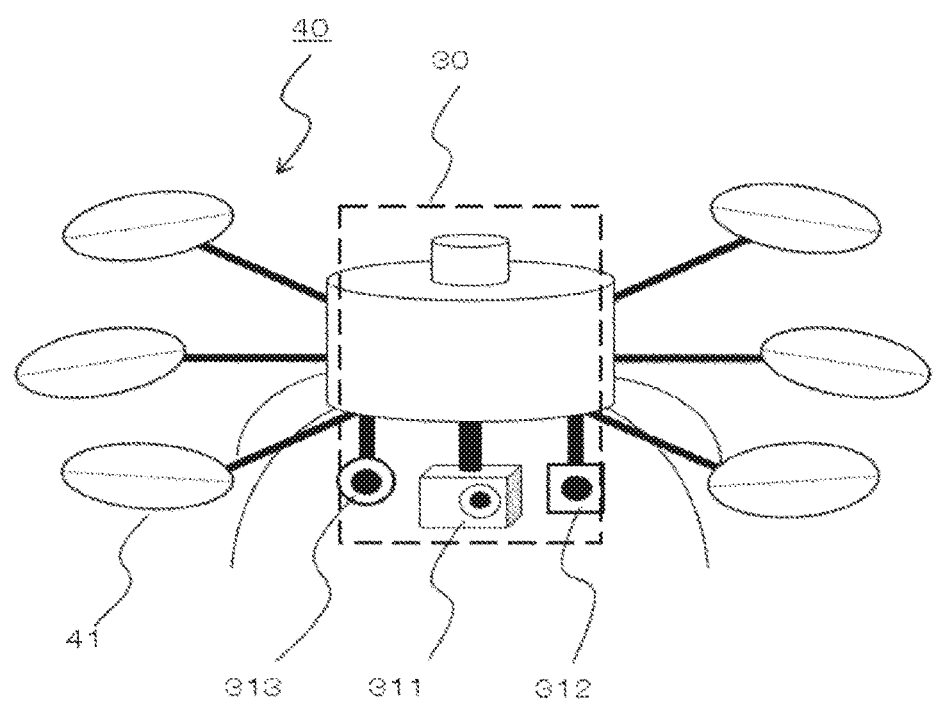
FIG. 4 is an external view of the profile measurement device according to Embodiment 1 of the present disclosure.

FIG. 4 is an external view of profile measurement device 30. The dotted box in FIG. 4 indicates profile measurement device 30. Profile measurement device 30 is mounted in air vehicle 40 which flies using multiple propellers 41. A measurement device 311, an identification code detection device 312, and a sign position measurement device 313 included in a sensor unit 31 of profile measurement device 30 are attached to the outer surface of air vehicle 40. Measurement device 311 is, for example, an image capturing device, and measures a profile of structure 10 from a flying position of air vehicle 40. Identification code detection device 312 is, for example, a combination of an image sensor and an image processing device, and detects an identification code from an image taken of identification mark 26. Sign position measurement device 313 is, for example, a laser sensor, an image sensor, or a combination thereof, and measures a distance to sign 20, or a direction relative to a front direction from sign 20, for example.

While identification code detection device 312 includes one sensor in FIG. 4, it should be noted that identification code detection device 312 may be a combination of two or more sensors. While sign position measurement device 313 also includes one sensor in FIG. 4, sign position measurement device 313 may be a combination of two or more sensors. Identification code detection device 312 and sign position measurement device 313 may be the same single sensor. If identification code detection device 312 includes a combination of multiple sensors, identification code detection device 312 and sign position measurement device 313 may also include the same combination of multiple sensors.

Figure 5:
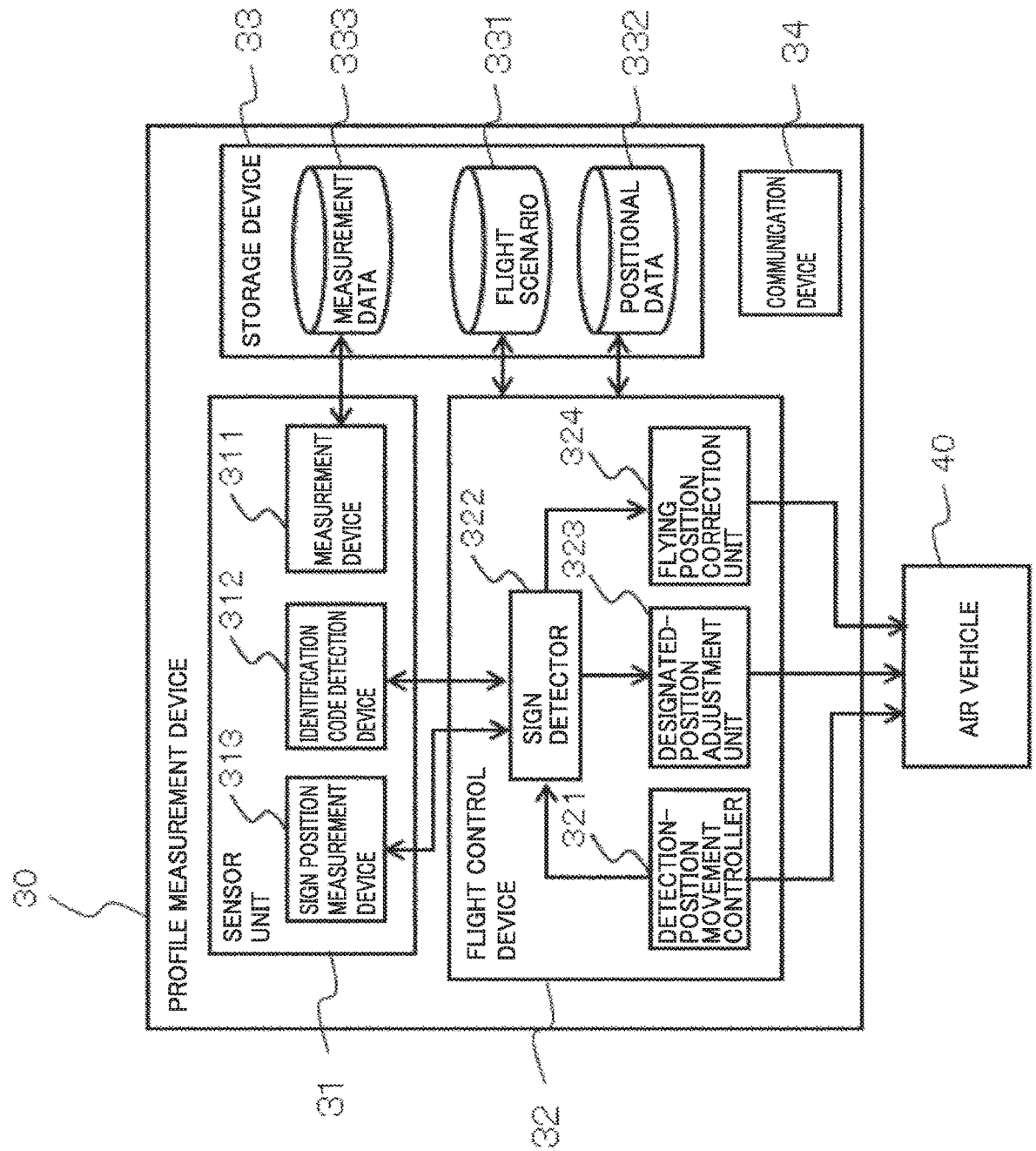
FIG. 5 is a block diagram of the profile measurement device according to Embodiment 1 of the present disclosure.

FIG. 5 is a block diagram of profile measurement device 30. In FIG. 5, profile measurement device 30 includes sensor unit 31, a flight control device 32, a storage device 33, and a communication device 34. Sensor unit 31 detects and measures structure 10 and signs 20. Flight control device 32 controls flight of air vehicle 40. Storage device 33 stores data for sensor unit 31 and flight control device 32 to use, and data output from sensor unit 31 and flight control device 32. Communication device 34 communicates and exchanges data and commands with remote control device 60.

Flight control device 32 includes a detection-position movement controller 321, a sign detector 322, a designated-position adjustment unit 323, and a flying position correction unit 324. Detection-position movement controller 321 causes air vehicle 40 to move to detection position 51 from which designated sign 21 is to be detected. As air vehicle 40 arrives at detection position 51, sign detector 322 detects an identification code of sign 20 and measures a flight relative position. The flight relative position is a position of air vehicle 40 relative to sign 20. As sign detector 322 detects the identification code of designated sign 21, designated-position adjustment unit 323 controls the flying position of air vehicle 40 based on the flight relative position and a position of via point 50 relative to designated sign 21, so that the flying position matches via point 50. When the identification code detected by sign detector 322 is different from a designated identification code, flying position correction unit 324 calculates a position of air vehicle 40, based on the flight relative position and a position of sign 20 having the detected identification code, and causes air vehicle 40 to move to detection position 51, based on the calculated position.

Storage device 33 stores a flight scenario 331, a positional data 332, and a measurement data 333. Flight scenario 331 predetermines via points 50 through which air vehicle 40 passes when profile measurement device 30 measures a profile of structure 10, and measurement operations which are performed by profile measurement device 30 at respective via points 50. Flight scenario 331 also includes information on the position of via point 50 relative to designated sign 21, and information on detection position 51 at which air vehicle 40 is positioned to detect designated sign 21. Positional data 332 includes positions and identification codes of respective signs 20. Measurement data 333 relates to the profile of structure 10 measured by sensor unit 31.

Flight scenario 331 is created in remote control device 60. Flight scenario 331 is input to profile measurement device 30 from remote control device 60 via communication device 34, and stored into storage device 33. Flight scenario 331 is used to control the measurement of structure 10 by measurement device 311, or is used by flight control device 32 to control the flight of air vehicle 40. Positional data 332 is created in remote control device 60. Positional data 332 is input to profile measurement device 30 from remote control device 60 via communication device 34 and stored into storage device 33. Positional data 332 is used by flight control device 32 to control the flight of air vehicle 40. Measurement data 333 stores data on profiles of structure 10 measured by measurement device 311. Measurement data 333 is sent to remote control device 60 via communication device 34.

Figure 6:
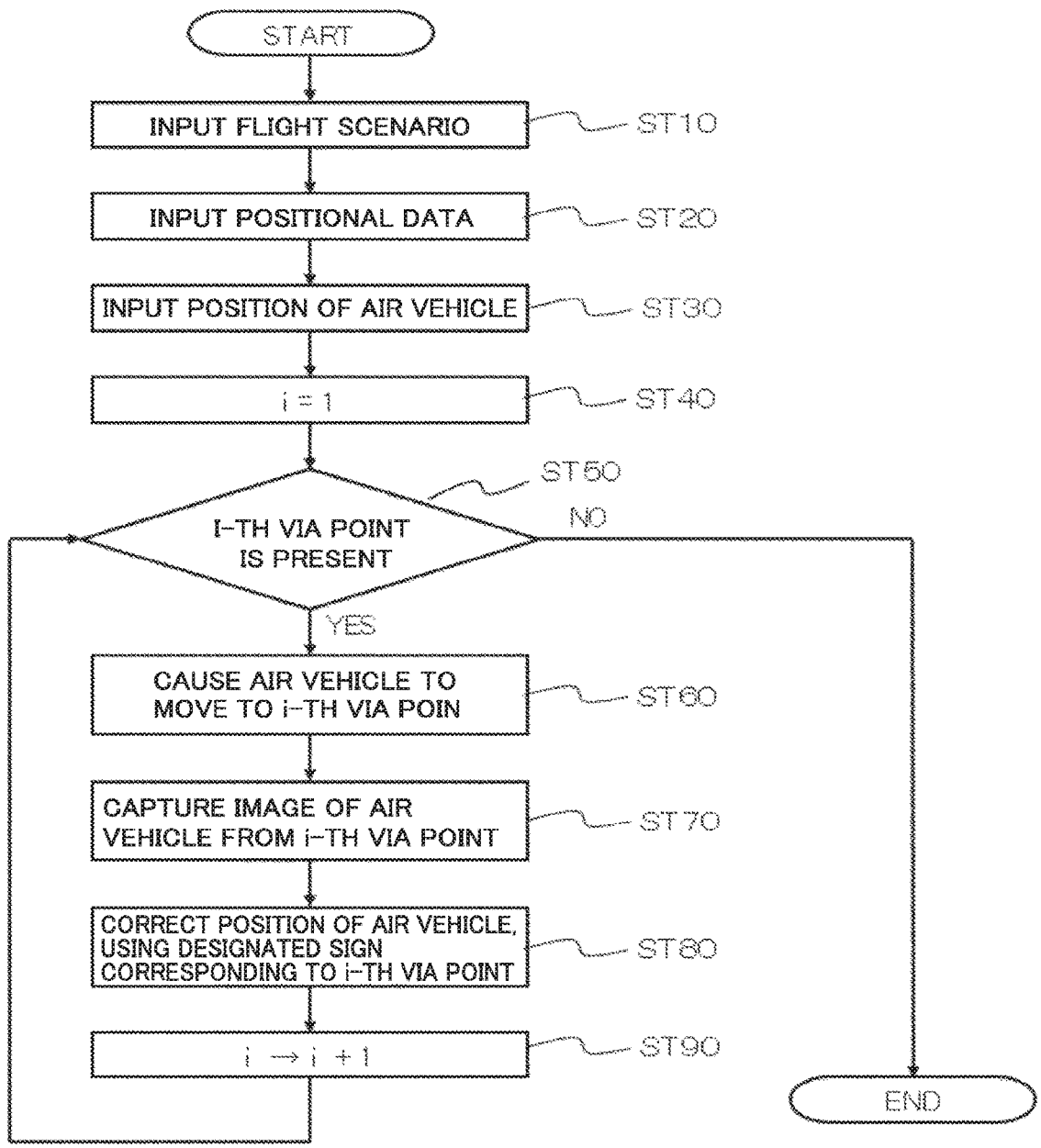
FIG. 6 is a flowchart illustrating operation procedure of the profile measurement device according to Embodiment 1 of the present disclosure.

FIG. 6 is a flowchart illustrating operation procedure of profile measurement device 30. In FIG. 6, prior to flight, flight scenario 331 edited in remote control device 60 is input from remote control device 60 to profile measurement device 30 and stored into storage device 33 (ST10). Flight scenario 331 indicates multiple via points 50 in a route order for the measurement of profiles of structure 10. Via points 50 are each indicated by an identification code of designated sign 21 corresponding to that via point 50. Flight scenario 331 further includes positions of respective via points 50 relative to corresponding designated signs 21, and positional coordinates of detection positions 51 for detecting corresponding designated signs 21. Next, positional data 332 is input from remote control device 60 to profile measurement device 30 and stored into storage device 33 (ST20). Positional data 332 includes positional coordinates and identification codes of all signs 20 that are put on structure 10. Positional data 332 is used by profile measurement device 30 to control the flight of air vehicle 40 according to flight scenario 331.

After data necessary for the flight is input and stored into storage device 33 as described above, positional coordinates of the position of air vehicle 40 are input to profile measurement device 30 (ST30). Here, as a way to input the positional coordinates of the position of air vehicle 40, for example, the positional coordinates may be input from remote control device 60 over communications, etc., or profile measurement device 30 may be provided with a control terminal and values of the positional coordinates may be manually input to profile measurement device 30. After this, flight control device 32 controls the flight of air vehicle 40, updating the input positional coordinates of the position of the air vehicle 40 while air vehicle 40 is in-flight. After ST30, flight control device 32 controls air vehicle 40 according to flight scenario 331 stored in storage device 33, while referring to positional data 332. As air vehicle 40 moves to given via points 50, profile measurement device 30 measures structure 10 from respective via points 50.

In the following, the flowchart represents the order of via points 50 on flight scenario 331 as i (i=1, 2, . . . ). First, when i=1, flight control device 32 controls air vehicle 40 to cause air vehicle 40 to move to i-th via point 50 (ST40). Initially, flight control device 32 checks if i-th via point 50 is included in flight scenario 331 (ST50). If i-th via point 50 is absent (NO in ST50), there is no via point 50 on flight scenario 331, and thus flight control device 32 determines that the measurement according to flight scenario 331 may be ended, and causes air vehicle 40 to return to a given return position and ends the measurement.

If i-th via point 50 is present (YES in ST50), flight control device 32 causes air vehicle 40 to move to i-th via point 50 (ST60). As air vehicle 40 moves to i-th via point 50, profile measurement device 30 causes measurement device 311 to measure structure 10 from i-th via point 50 (ST70). Moreover, as air vehicle 40 moves to i-th via point 50, flight control device 32 corrects the positional coordinates of the position of air vehicle 40, based on positional coordinates of designated sign 21 corresponding to i-th via point 50 in positional data 332 stored in storage device 33 (ST80).

After profile measurement device 30 measures structure 10 and flight control device 32 corrects the positional coordinates of the position of air vehicle 40, the order i of via points 50 on flight scenario 331 is incremented by 1 (ST90). After this, profile measurement device 30 repeats the operations ST50 to ST90, until there is no longer i-th via point 50 on flight scenario 331 at ST50.

As described above, profile measurement device 30 repeats, using measurement device 311, the movement to via point 50 according to flight scenario 331 and the measurement of structure 10 at via point 50, thereby measuring an entire profile of structure 10.

Figure 7:
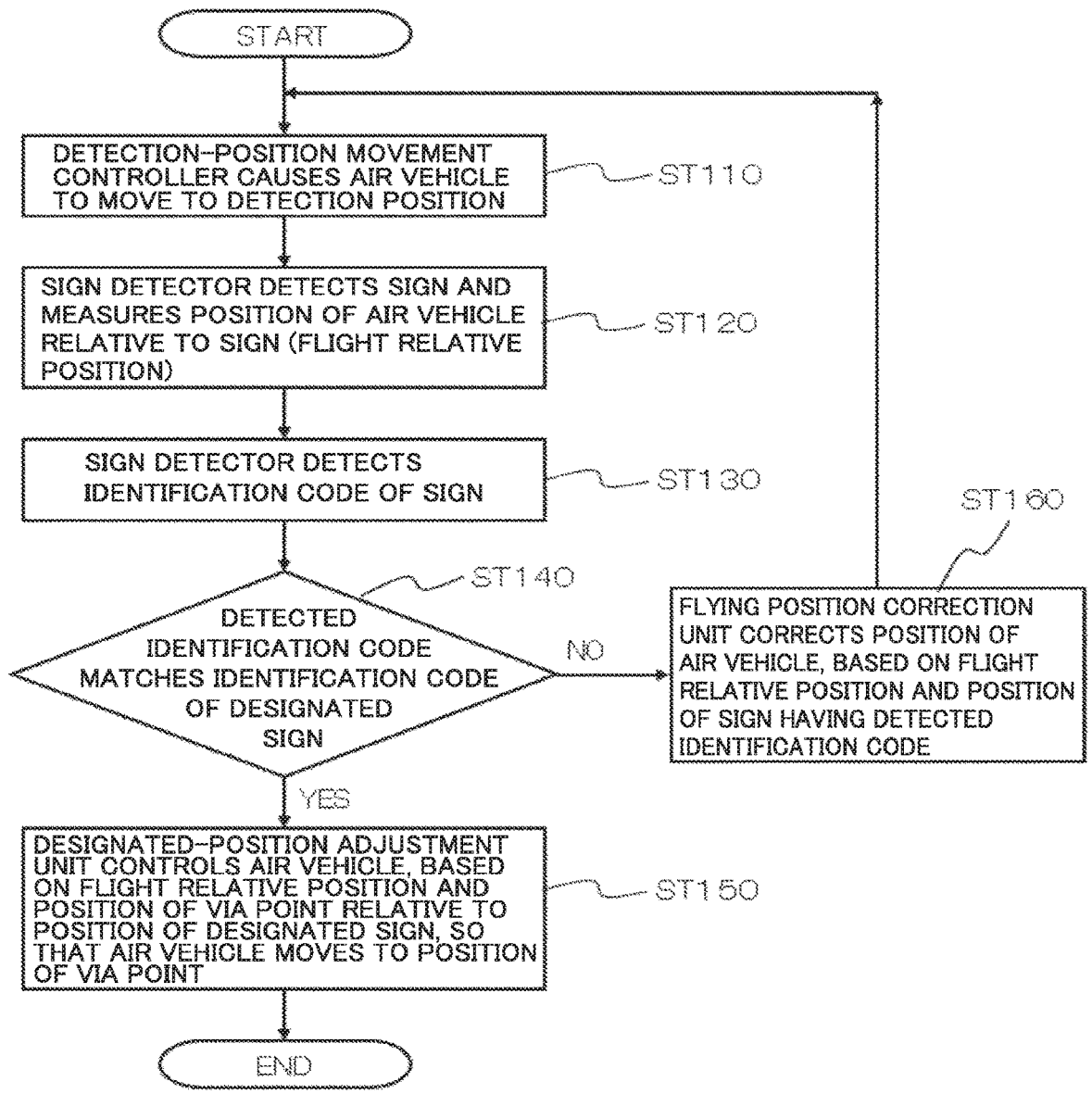
FIG. 7 is a flowchart illustrating operation of the flight control device according to Embodiment 1 of the present disclosure, causing an air vehicle to move to a via point.

FIG. 7 is a flowchart illustrating operation of flight control device 32 causing air vehicle 40 to move to respective via points 50. The flowchart illustrates the operation of flight control device 32 at ST60 in FIG. 6. In the following, via point 50 in the description of the flowchart represents i-th via point 50 in flight scenario 331 in the flowchart in FIG. 6.

Initially, detection-position movement controller 321 included in flight control device 32 causes air vehicle 40 to move to detection position 51 corresponding to via point 50, based on positional data 332 stored in storage device 33 (ST110). After air vehicle 40 is moved to via point 50 by detection-position movement controller 321, sign detector 322 directs sign position measurement device 313 of sensor unit 31 toward sign 20 that is detectable from the position of air vehicle 40, and measures a position of air vehicle 40 relative to that sign 20 (ST120). Moreover, sign detector 322 directs identification code detection device 312 of sensor unit 31 toward sign 20 whose position relative to air vehicle 40 has been measured by sign position measurement device 313, and detects an identification code of that sign 20 (ST130).

After identification code detection device 312 detects the identification code, flight control device 32 checks if the detected identification code matches an identification code of designated sign 21 corresponding to via point 50 (ST140). If the identification code detected by identification code detection device 312 and the identification code of designated sign 21 corresponding to via point 50 match (YES in ST140), flight control device 32 causes, using designated-position adjustment unit 323, air vehicle 40 to move to via point 50. Designated-position adjustment unit 323 controls air vehicle 40 so that the position of air vehicle 40 and the position of via point 50 match, based on positions stored in flight scenario 331, the positions including the position of via point 50 relative to the position of designated sign 21 and the position of air vehicle 40 relative to the position of designated sign 21 measured by sign position measurement device 313 (ST150).

If the identification code detected by identification code detection device 312 and the identification code of designated sign 21 corresponding to via point 50 do not match (NO in ST140), it indicates that the flying position of air vehicle 40 is different from via point 50 and thus incorrect. For this reason, flight control device 32 corrects the positional coordinates of the position of air vehicle 40, based on the position of sign 20 detected by sign detector 322. Specifically, flying position correction unit 324 included in flight control device 32 calculates a position of air vehicle 40, based on the position, on positional data 332, of sign 20 detected by sign detector 322 so that the position of air vehicle 40 is relative to sign 20 detected by sign detector 322 (ST160). After the positional coordinates of the position of air vehicle 40 are corrected, flight control device 32 returns to the series of operations that begins with ST110 to control air vehicle 40 to cause air vehicle 40 to travel to via point 50.

As described above, according to the flight control device and the profile measurement device of Embodiment 1 of the present disclosure, in order to cause the air vehicle to move to a given via point, the via point is determined relative to a position of a designated sign on the structure, thereby allowing for accurate adjustment of the position of the air vehicle relative to the structure. Additionally, according to the flight control device and the profile measurement device of Embodiment 1 of the present disclosure, the signs on the structure are used to accurately determine the position of the air vehicle relative to the structure. Further, according to the flight control device and the profile measurement device of Embodiment 1 of the present disclosure, in addition to the via points through which the air vehicle passes, detection positions corresponding to the via points are provided, and the air vehicle is caused to move from a detection position to a via point, thereby readily defining a flight route that allows the air vehicle to fly around the structure having a complex profile, without colliding against the structure.

The embodiment according to the present disclosure presently disclosed above should be considered in all aspects illustrative and not restrictive. It is intended that the scope of the present disclosure is defined by the appended claims, and all changes which come within the meaning and range of equivalency of the appended claims are to be embraced within their scope.

What is claimed is:

1. A flight control device which controls an air vehicle flying around a structure on which a plurality of signs are disposed at a plurality of locations, while passing through via points, the plurality of signs having different identification codes, the via points each being determined by a position of a via point relative to a predetermined designated sign among the plurality of signs, the flight control device comprising: processing circuitry configured to instruct the air vehicle to move to a detection position for detecting the predetermined designated sign, the detection position being given for the predetermined designated sign, detect, when the air vehicle arrives at the detection position, an identification code of the predetermined designated sign and measure a flight relative position which is a distance of the air vehicle relative to the predetermined designated sign, and control, when the identification code of the predetermined designated sign is detected, a flying position of the air vehicle, based on the measured flight relative position and a position of the via point relative to the predetermined designated sign, so that the flying position matches the via point.

2. The flight control device according to claim 1, wherein the processing circuitry is further configured to, when a sign detector detects an identification code different from the identification code of the predetermined designated sign, calculate a position of the air vehicle, based on the flight relative position and a position of the predetermined designated sign having the detected identification code, and instruct the air vehicle to move to the detection position based on the calculated position.

3. A profile measurement device, comprising:
the flight control device according to claim 2; and
a measurement device which is mounted in the air vehicle and measures a profile of the structure.

4. A profile measurement device, comprising:
the flight control device according to claim 1; and
a measurement device which is mounted in the air vehicle and measures a profile of the structure.

\* \* \* \* \*